United States Patent [19]

Gardner et al.

[11] Patent Number: 4,918,157

[45] Date of Patent: Apr. 17, 1990

[54] THERMOSETTING COMPOSITION COMPRISING CYANATE ESTER, UREA COMPOUND AND EPOXY RESIN

[75] Inventors: Hugh C. Gardner, Hillsborough; Richard H. Newman-Evans, Somerville, both of N.J.

[73] Assignee: Amoco Corporation, Chicago, Ill.

[21] Appl. No.: 250,838

[22] Filed: Sep. 28, 1988

Related U.S. Application Data

[62] Division of Ser. No. 71,215, Jul. 8, 1987, Pat. No. 4,804,740.

[51] Int. Cl.$^4$ .............................................. C08G 83/00
[52] U.S. Cl. .................................... 528/322; 525/421; 525/480; 525/481; 525/526; 525/534; 525/535; 525/539; 528/107; 528/119; 528/120; 528/422

[58] Field of Search ............... 528/322, 422, 107, 119, 528/120; 525/421, 480, 481, 526, 534, 535, 539

[56] References Cited

U.S. PATENT DOCUMENTS 4,804,740  2/1989  Gardner et al. ..................... 528/422

Primary Examiner—Harold D. Anderson
Attorney, Agent, or Firm—Richard J. Schlott; William H. Magidson; Ralph C. Medhurst

[57] ABSTRACT

Urea compounds having a plurality of substituents selected from hydrogen, substituted hydrocarbyl radicals and unsubstituted hydrocarbyl radicals are good latent cure accelerators for thermosetting cyanate resin formulations. The resulting cyanate resin formulations are useful as coatings, adhesives and as impregnating resins, particularly in applications where extended storage at or near room temperature is desired.

7 Claims, No Drawings

THERMOSETTING COMPOSITION COMPRISING CYANATE ESTER, UREA COMPOUND AND EPOXY RESIN

This is a division of application Ser. No. 071,215, filed July 8, 1987 now U.S. Pat. No. 4,804,740.

BACKGROUND OF THE INVENTION

This invention relates to thermosetting resins and more particularly to thermosetting cyanate esters. Still more particularly, this invention relates to the use of urea compounds as latent cure accelerators for cyanate esters, and to thermosetting cyanate ester formulations comprising cyanate esters and urea compounds.

Cyanate esters are well-known in the art and widely used in formulating adhesives, binders, coatings and impregnants. Such formulations may also include oligomeric compounds with reactive cyanate ester functionality as well as a variety of other coreactants such as epoxy resins in order to reduce costs and to modify properties such as toughness, moisture sensitivity and thermal behavior in the resulting thermoset materials.

Cyanate esters may generally be cured merely by heating. Catalysts used to promote curing under milder conditions have included Lewis acids such as aluminum chloride, ferric chloride and the like, mineral acids such as hydrochloric acid, salts such as sodium acetate, potassium thiocyanate and the like, phenolic compounds and bases such as sodium methoxide, pyridine, triethyl amine and the like. Metal chelates such as copper, zinc or ferric acetylacetonates have been reported as being capable of promoting a smooth, controllable cure rate at moderate temperatures. Such catalysts are said to be generally less moisture sensitive, and possibly less hazardous than many of the catalyst systems available for cyanate esters.

Many of the prior art catalysts are highly active and may even promote rapid curing at room temperature in many cyanate ester formulations. The storage stability of cyanate ester materials and formulations based on such catalysts may therefore be brief, making the formulations difficult to use for many applications by requiring storage conditions that may be difficult or impractical to achieve. The more stable cyanate ester formulations, those based on the less-active prior art catalysts, may be more difficult to cure adequately even when extended cure cycles are used. Extended cure times, particularly at elevated temperatures, increase the cost of production and may cause damage to substrates as well as to other components of the formulation. In addition, insufficient cure levels tend to result in brittle materials having an increased sensitivity toward moisture. Cyanate ester cure accelerators having little or no catalyst activity at or near room temperature and a high degree of activity at moderately elevated temperatures are thus needed. Such accelerators are termed latent cure accelerators, and may be used to provide storage-stable cyanate ester formulations that are rapidly and completely cured at moderate temperatures.

Some of the presently available catalysts exhibit a degree of latent curing character or latency when used in combination with some cyanate resins. However, such catalysts are few in number. The uses of cyanate ester formulations by the coatings, adhesives and laminating arts encompass a great variety of applications. The curing conditions required by these applications will vary widely, and the latent curing behavior needed for some applications may be measured in hours, while others may require stability for days or even weeks at room temperature. Moreover, the residues characteristic of some catalysts may not be acceptable for particular applications and end uses. Thus there is a continuing need for a greater variety of cure catalysts and latent cure accelerators, in order to allow the resin formulator to modify the curing behavior and storage characteristics of cyanate ester-based resin formulations, thereby becoming better able to meet the demands of these industries.

SUMMARY OF THE INVENTION

N-substituted urea compounds are effective latent cure accelerators for cyanate esters. Formulations comprising such urea compounds exhibit good storage stability at room temperature and rapidly reach a high degree of cure at moderately elevated temperatures. The formulations are particularly useful in coatings, adhesive and impregnant applications where extended storage of coated or impregnated substrates in an uncured state may be desirable.

DETAILED DESCRIPTION

The urea compounds useful as cure accelerators in the practice of this invention are urea compounds having a plurality of N substituents. The compounds may be further represented by the structural formula $RR^1-N-CO-N-R^2R^3$, wherein R and $R^2$ are independently selected from hydrogen and organo radicals, and $R^1$ and $R^3$ are independently selected organo radicals. The organo radicals may be either substituted or unsubstituted aliphatic and aromatic hydrocarbyl radicals, including those selected from, for example, $C_1$ to $C_6$ alkyl radicals, aralkyl radicals, aryl radicals and the like, and R and $R^1$ may join together to form a cycloalkylene radical. The hydtocarbyl radicals may be further substituted with any of a variety of groups including halogen or the like which are inert and nonreactive toward the remaining components of the resin formulations. Examples of such urea compounds include the alkyl aryl ureas and aryl ureas such as 1,1-dimethyl-3-phenyl urea, 1,1-dimethyl-3-(4-chlorophenyl) urea, 1,1-dimethyl-3-(3,4-dichlorophenyl) urea, 1,3-diphenyl urea, 1-(4-chlorophenyl)-3-(3,4-dichlorophenyl) urea and the like. Also useful are urea compounds having a plurality of urea functional groups, including for example the reaction products of alkyl amines, alkylene diamines and dialkylene triamines with aryl isocyanates and diisocyanates, such as those urea compounds shown for example in U.S. Pat. Nos. 3,386,955 and 4,594,373.

The cyanate esters useful in preparing formulations curable with urea compounds according to the teachings of this invention are aryl compounds having a plurality of cyanate ester groups per molecule, and may be generally represented by the formula $Ar(OCN)_m$ wherein m is an integer of from 2 to 5 and Ar is an aromatic radical. The aromatic radical Ar will contain at least 6 carbon atoms, and may be derived, for example, from aromatic hydrocarbons such as benzene, biphenyl, naphthalene, anthracene, pyrene or the like. The aromatic radical Ar may also be derived from a polynuclear aromatic hydrocarbon in which at least two aromatic rings are attached to each other through a bridging group. Also included are aromatic radicals derived from novolak-type phenolic resins, i.e., the cyanate esters of these phenolic resins. The aromatic radical Ar may also contain further ring-attached, nonreactive substituents.

Useful cyanate esters may include, for example, 1,3-dicyanatobenzene; 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanato-biphenyl; bis(4-cyanophenyl)methane and 3,3',5,5'-tetramethyl bis(4-cyanatophenyl) methane; 2,2-bis(3,5-dichloro4-cyanatophenyl)propane; 2,2-bis(3,5-dibromo-4-dicyanatophenyl)propane; bis(4-cyanatophenyl)ether; bis(4-cyanatophenyl)sulfide; 2,2-bis(4-cyanatophenyl)propane; tris(4-cyanatophenyl)-phosphite; tris(4-cyanatophenyl)phosphate; bis(3-chloro-4-cyanatophenyl)methane; cyanated novolak; cyanated bisphenol-terminated polycarbonate or other thermoplastic oligomer; and mixtures thereof. Also included are cyanates of poly(alkenylphenol) compounds disclosed in U.S. Pat. No. 4,477,629, cyanates from bisphenols of dicyclopentadiene which are disclosed in, for example, U.S. Pat. No. 4,528,366, the cyanates disclosed in British Pat. No. 1,305,702, and the canates disclosed in PCT published application WO 85/02184. These and a wide variety of other cyanate esters are widely known in the art and many are commercially available.

The cyanate esters may be used singly or as mixtures. The cyanate esters may also be used in the form of a prepolymer, made by heating a polyfunctional cyanate monomer at a temperature of 130° to 220° C. for a period of 0.1 to 15 hours, oligomerizing the cyanate ester and increasing the molecular weight. Also useful are mixtures of the prepolymer with monomeric cyanate esters, and many of the commercially available cyanate esters are such mixtures of cyanate monomers and prepolymers.

In general, the thermosetting compositions of this invention will comprise from 0.5 pbw to 12 pbw of the urea compound per 100 pbw of the cyanate ester. The specific level employed will depend in part upon the particular cyanate ester and urea compounds employed.

The compositions of this invention may further comprise additional polymerizable, curable components, such as, for example, epoxy resins, bismaleimide resins and the like.

Epoxy resins useful as further components in the practice of this invention include any of the great variety of polyfunctional epoxy resins widely known and readily available from commercial sources. Among these are the polyglycidyl derivatives of phenolic compounds, such as those available commercially under the trade names such as Epon 828, Epon 1001, Epon 1009 and Epon 1031 from Shell Chemical Co., DER 331, DER 332, DER 334 and DER 542 from Dow Chemical Co., and BREN-S from Nippon Kayaku, Japan. Other suitable epoxy resins include polyepoxides prepared from polyols and the like and polyglycidyl derivatives of phenol-formaldehyde novolaks. The latter are commercially available as DEN 431, DEN 438, and DEN 439 from Dow Chemical Company. Cresol analogs are also available as ECN 1235, ECN 1273, and ECN 1299 from Ciba-Geigy Corporation. SU-8 is a Bis-A epoxy novolak from Interez, Inc. Polyglycidyl adducts of amines, aminoalcohols and polycarboxylic acids are also useful in the practice of this invention. Commercially available resins of this type include Glyamine 135, Glyamine 125, and Glyamine 115 from F.I.C. Corporation, Araldite MY-720, Araldite 0500, and Araldite 0510 from Ciba-Geigy Corporation and PGA-X and PGA-C from The Sherwin-Williams Co.

Also suitable are epoxy-terminated thermoplastic polymers such as the epoxy-terminated polysulfones disclosed in U.S. Pat. No. 4,448,948.

The bismaleimides that may be used as further components in the present invention are organic compounds containing two maleimide groups and are prepared generally from maleic anhydride and diamines. The preferred bismaleimides are derived from aromatic diamines and most preferred are those that include a polynuclear aromatic radical. Examples of such bismaleimides include 2,2-bis(4-aminophenoxy-4-phenyl)propane bismaleimide, 4,4'-bis(3-aminophenoxy)diphenyl sulfone bismaleimide, 1,4-bis(3-aminophenyl isopropylidene)benzene bismaleimide and bis(4-aminophenyl)methane bismaleimide. The bismaleimides may be used singly or as mixtures. Bismaleimides may be prepared by a number of well-known methods from maleic anhydride and diamines, and a great many are readily available from commercial sources.

The curable cyanate ester formulations of this invention may include any of a variety of additional modifying components to meet the requirements peculiar to the intended use. Where the added resins are also curable and thermosetting, it may be necessary and desirable to include curing agents for such resins. Thermoplastics such as polysulfones, poly(aryl ethers), aromatic polyesters, polyamides, and the like, and rubbery modifiers such as silicone rubbers, diene rubbers, acrylic rubbers and rubbery polyesters, and particularly those thermoplastics and modifiers that are miscible with cyanate esters, all of which are well-known and frequently used in the resin formulating art, may be added to provide improved toughness. Organic and inorganic fillers and reinforcing fibers may also be included, as may pigments, dyes, lubricants, thickeners, stabilizers and the like as is commonly practiced in the art. The curable cyanate ester formulations of this invention may be particularly useful as matrix resins and, when combined with reinforcing fibers such as glass fiber, carbon fiber, graphite fiber and the like, in chopped or continuous form or in the form of either woven or non-woven textile fabric or mat, the compositions may be used for the production of prepreg, fiber-reinforced laminates, composites and the like.

The practice of this invention will be better understood from a consideration of the following illustrative examples. In the following examples, the components and test procedures used include:

Cyanate Esters

Cyanate Ester A. Prepolymer of bisphenol A dicyanate, obtained as RDX 80352 from Interez, Inc.

Cyanate Ester B. A polycyanate of a polyphenol adduct of dicyclopentadiene, obtained as XU71787 from Dow Chemical Company.

Cyanate Ester C. A prepolymer of bisphenol A dicyanate containing 10 percent by weight of 4,4'-methylene dianiline bismaleimide, obtained as BT2160 resin from Mitsubishi Gas Chemical Company.

Epoxy Resins

Epoxy DEN 431. Epoxidized phenol-formaldehyde novolac with a weight per epoxy equivalent of 176 g, from Dow Chemical Company.

Epoxy Epiclon 830. A bisphenol F epoxy resin with a weight per epoxy equivalent of 170 g, obtained from Dianippon Ink Company.

Thermoplastic

Polysulfone PSF. Polyarylene ether of bisphenol A and dichlorodiphenyl sulfone, Mn=24,000, from Amoco Performance Products, Inc.

Gel Time Procedure:

Gel times were measured by placing a small portion (~0.1 g) of the resin mixture between two circular microscope slips on the heated stage of a Fisher-Johns melting point apparatus, preheated to 350° F. Periodically the top glass slip was poked with a wooden stiple to see if the resin was still fluid. The gel time was taken as the time when the resin first failed to flow under the influence of pressure. The gel times were an average of from two to six determinations.

EXAMPLE 1-11

A 4 oz glass jar, charged with 50 g of the cyanate ester was heated in an oil bath at 80° to 100° C. The contents of the jar were rapidly stirred as the urea compound was added, stirred for an additional 3 min. and then removed from the bath. The gel time at 350° F. was then measured.

Table I summarizes gel times for various cyanate esters and accelerator mixtures, and for the control Examples A-D, determined without added urea compound. Typically at the 4 phr level, the accelerators of this invention reduce the gel times by ½ to ¾ of the gel time values for the unaccelerated cyanate esters.

TABLE I

| Ex. No. | Urea Cmpd (4 pbw) | Gel Time (min.) |
|---|---|---|
| Cyanate Ester A (100 pbw) | | |
| 1 | 1,1-dimetyl-3-phenyl urea | 17 |
| 2 | 3-(4-chlorophenyl)-1,1-dimethyl urea | 14 |
| 3 | 3-(3,4-dichlorophenyl)-1,1-dimethyl urea | 14 |
| 4 | 1,3-diphenyl urea | 23 |
| 5 | 2,4-bis(N,N—dimethylureido) toluene | 10 |
| A | None | >50 |
| Cyanate Ester B (100 pbw) | | |
| 6 | 1,1-dimethyl-3-phenyl urea | 29 |
| B | None | 70 |
| Cyanate Ester C (100 pbw) | | |
| 7 | 1,1-dimethyl-3-phenyl urea | 10 |
| C | None | 46 |
| Cyanate Ester A (80 pbw) and Epoxy DEN 431 (20 pbw) | | |
| 8 | 1,1-dimethyl-3-phenyl urea | 8 |
| 9 | 3-(4-chlorophenyl)-1,1-dimethyl urea | 12 |
| 10 | 3-(3,4-dichlorophenyl)-1,1-dimethyl urea | 10 |
| 11 | 1-(4-chlorophenyl)-3-(3,4-dichlorophenyl) urea | 10 |
| D | None | 22 |

It will be apparent from a comparison of the gel times for the various cyanate compositions presented in Table I that the gel times at 350° F. are markedly shortened when an organo-substituted urea compound is added thereto.

EXAMPLE 12 through 16 and Controls E through G

A series of unreinforced castings were prepared from various cyanate ester/accelerator formulations.

In a typical procedure, a 4 oz glass jar was charged with 48 g of cyanate ester and heated in an oil bath at 80° to 100° C. After the material became fluid, it was stirred while 2.0 g of a urea accelerator were added. Stirring was continued for three minutes, after which a portion of the mixture was poured into a glass mold with dimensions of ⅛"×3"×4".

The formulation was cured in an oven using the following cure schedule:

Heat from 77° F. to 248° F. at 3° F./min
Hold 2 hr at 248° F.
Heat from 248° F. to 350° F. at 3° F./min
Hold 2 hr at 350° F.
Cool to 77° F. at 3° F./min Test coupons with nominal dimensions of ⅛"×0.4"×3" were cut from the cured castings to determine the glass transition temperature using a DuPont 982 dynamic mechanical analyzer. The glass transition temperature was taken as the maximum in the loss modulus peak. The heating rate for all glass transition temperature measurements was 10° C./min.

EXAMPLE 17

A 250 ml, 3-necked flash equipped with a paddle stirrer, thermometer, inlet and outlet for inert gas, and heated in an oil bath was charged with 18 g of Epiclon 830 and 8 g of powdered polysulfone The mixture was heated and stirred for 1 hr at 140° C. as the polysulfone dissolved. To this stirred solution at 140° C. was added 72 g of warm (100° C.) Cyanate Ester B over a 5 minute period. As soon as the addition was complete, the mixture was stirred for 5 more minutes as it cooled to 100° C. To this solution was added 2.0 g of 1,1-dimethyl-3-phenyl urea. The mixture was stirred at 100° C. for 3 minutes. Then the mixture was poured into a glass mold having a cavity with dimensions of ⅛"×4"×3" and cured using the following cure schedule:

Heat from 77° F. to 350° F. at 1.1° F./min.
Hold 2 hr. at 350° F.
Cool to 77° F. at approx. 2.2° F./min.

The cured casting was hard and clear. A coupon with approximate dimensions of 0.4"×3.0"×⅛" was cut from the casting and was used to measure the glass transition temperature on a DuPont DMA (scan rate 10° C. per minute). The glass transition temperature was 218° C.

EXAMPLE 18

Following the procedure in Example 17, an unreinforced casting was prepared from 98 g of the Epiclon 830/polysulfone/Cyanate Ester B masterblend (18/8/72 wt. ratio) and 6.0 g of 1,1-dimethyl-3-phenyl urea. The glass transition temperature on the cured casting was 218° C.

Control H

An unreinforced casting was prepared using Epiclon 830/polysulfone/Cyanate Ester B masterblend (18/8/72 wt ratio). The procedure was the same as in Examples 17 and 18 except that no urea compound was used as an accelerator. The unreinforced casting had a glass transition temperature of 133° C.

Table II summarizes the glass transition temperatures of several cyanate ester/accelerator formulations

TABLE II

| | Cured Castings | |
|---|---|---|
| Ex. No. | Urea Cmpd | Tg °C. |
| Cyanate Ester A (100 pbw) | | |
| 12 | 1,1-dimethyl-3-phenyl urea (4 pbw) | 197 |
| 13 | 1,1-dimethyl-3-phenyl urea (6.7 pbw) | 218 |
| 14 | 1-(4-chlorophenyl)-3-(3,4-dichlorophenyl) urea (4 pbw) | 216 |
| E | None | 124 |
| Cyanate Ester C (100 pbw) | | |
| 15 | 1-(4-chlorophenyl)-3-(3,4-dichlorophenyl) urea (4 pbw) | 195 |

TABLE II-continued

Cured Castings

| Ex. No. | Urea Cmpd | Tg °C. |
|---|---|---|
| F | None | 88 |
| Cyanate Ester A (80 pbw) and Epoxy DEN 431 (20 pbw) | | |
| 16 | 1-(4-chlorophenyl)-3-(3,4-dichlorophenyl) urea (4 pbw) | 245 |
| G | None | 233 |
| Cyanate Ester B (72 pbw), Epiclon 830 (18 pbw) and PSF (8 pbw) | | |
| 17 | 1,1-dimethyl-3-phenyl urea (2 pbw) | 218 |
| 18 | 1,1-dimethyl-3-phenyl urea (6.1 pbw) | 218 |
| H | None | 133 |

Note:
Cure schedules and conditions are shown in text.

The Tg data for the various unreinforced castings summarized in Table II demonstrate the high degree of cure obtained with the compositions of this invention under standard cure schedules commonly used in the art. Equivalent formulations without a cure accelerator achieved a much lower degree of cure when subjected to equivalent cure schedules.

EXAMPLE 19

A 500 ml 3-necked flask equipped with a paddle stirrer, thermometer, inlet and outlet for inert gas, and an electric heating mantle was charged with 200 g of Cyanate Ester A. The resin was heated with stirring to 90° C. at which temperature a mixture of 8.0 g of DEN 431 epoxy novolac resin and 8.0 g of 1,1-dimethyl-3-phenyl urea was added. The mixture was stirred for 1.5 hr at 100° C., degassed to remove trapped air bubbles, and then poured into a glass mold with dimensions of $\frac{1}{8}"\times 8"\times 9"$. The resin was cured in a forced air oven using the following cure schedule:
Heat from 77° F. to 248° F. in 1 hr
Hold at 248° F. for 1 hr
Heat from 248° F. to 350° F. in 1 hr
Hold at 350° F. for 2 hr
Cool from 350° F. to 77° F. in 1 hr The cured casting was hard and transparent. Specimens were cut from the casting to measure mechanical and thermal properties. The tensile strength of the cured resin was measured according to ASTM D-638 (Type 1 dogbone) and was found to be 10,500 psi. The tensile modulus was 465 ksi. The glass transition temperature was 220° C.

EXAMPLE 20

A 16 oz. glass jar was charged with 243 g of Cyanate Ester A and 45 g of a blend of Epoxy DEN 431 and PSF (3:1 by weight) and heated in a forced air oven at 80° C. for 15 min. The jar was then removed from the oven and the contents were stirred for 5 min. to ensure homogeneity before adding 12 g of 1-(4-chlorophenyl)-3-(3,4-dichlorophenyl) urea. The gel time at 350° C. was 9.3 min. The mixture was cast and cured as in Examples 12-16, to provide test specimens. The Tg, determined as before, was 253° C.

EXAMPLE 21

A 5 l flask equipped with a paddle stirrer, thermometer, inlet and outlet for inert gas and heated in an oil bath was charged with 2315 g of Cyanate Ester A, 92.5 g of Epoxy DEN 431, and 92.5 g of 1,1-dimethyl-3-phenyl urea. The mixture was heated at 95° C. for 1.75 hrs to adjust its viscosity for making prepreg.

A thin film of the resin was cast on a silicone coated release paper. A unidirectional prepreg tape was made by transferring the resin from the coated paper to a ribbon of carbon fiber under the action of heat and pressure in a prepreg machine. The final prepreg had fiber areal weight of 143 g/m$^2$, a resin content of 33.4 percent by weight, and a width of 12 inches. The fiber used to make the tape was a pitch-based carbon fiber with a tensile strength of 260 ksi, a tensile modulus of 75 msi, density of 2.0 g/cc, and a filament count of 2,000 filaents per tow. When stored at room temperature, the prepreg retained tack and drape characteristics for more than 15 days, demonstrating that the cure accelerators of this invention possess a low degree of room temperature cure activity, i.e., good latency.

The unidirectional tape was laid up into an 8-ply quasi-isotropic laminate with a $(0, \pm 45, 90)_s$ configuration. The laminate was cured in an autoclave under a pressure of 100 psi at a temperature of 350° F. for 2 hrs. The cured laminate was rigid and hard.

EXAMPLE 22

A 2 l, 3-necked flask equipped with thermometer, inlet and outlet for inert gas, a paddle stirrer, and heated in an oil bath was charged with 180 g of Epiclon 830 and 80 g of powdered polysulfone. The mixture was heated and stirred for 45 min at 140° C. as the polysulfone dissolved. To this stirred solution at 140° C. was added 720 g of Cyanate Ester B over a 10 min period. As soon as the addition was complete, the mixture was cooled with stirring to 100° C. Ten minutes later, when the mixture reached 100° C., 40 g of 1,1-dimethyl-3-phenyl urea was added. The mixture was heated and stirred at 100° C. for 15 minutes and then discharged into pans. Another 1000 g resin batch of Epiclon 830/polysulfone/Cyanate Ester B/1,1-dimethyl-3-phenyl urea was prepared in an identical manner. The two resin batches were combined, warmed to 80° C., and coated as a thin film on release paper. A unidirectional prepreg tape was prepared by transferring the resin from the coated paper to a ribbon of carbon fiber under the action of heat and pressure in a prepreg machine. The final prepreg had a fiber areal weight of 147 g/m$^2$, resin content of 36.8 percent by weight, and nominal width of 12 inches. The fiber used to make the tape was a polyacrylonitrile-based carbon fiber with a tensile strength of 730 ksi, tensile modulus of 41.5 msi, density of 1.8 g/cc, yield of 0.44 g/m and filament count of 12,000 per tow. The uncured prepreg tape, stored at room temperature, retained tack and drape for more than 14 days, again demonstrating the excellent latency of cyanate ester formulations that incorporate the urea cure accelerators of this invention.

The unidirectional tape was laid up into a 32 ply, $15"\times 15"$ laminate with an orientation of $(0, \pm 45, 90)_{4s}$. The laminate was cured in an autoclave under a pressure of 100 psi using a straight up cure cycle (ramp from 77° F. to 50° F. at 3° F./min; hold 2 hr at 350° F.; cool to 77° F. at ° F./min). The cured laminate was machined into $4"\times 6"$ test panels. The panels had a nominal thickness of 0.18 inches and were impacted in the center with a Gardner type impact tester (Gardner Laboratories, Bethesda, MD) having a 5/8 inch diameter spherical indenter. The impact was normal to the plane of fibers. When impacted, the $4"\times 6"$ panel was simply supported over a 3 inch by 5 inch cutout in an aluminum plate with a plywood backup. The impacted panel was tested for residual compressive strength in a steel fixture that constrained the edges from out-of-plane buckling. After an impact of 1500 in-lb/ in of thickness, the test panel had a residual compressive strength of 31 ksi.

EXAMPLE 23

A 2 liter, 3-necked flask equipped with a paddle stirrer, thermometer and inlet and outlet for inert gas was charged with 860 g of Cyanate Ester B.

The flask was placed in an oil bath at 100° C. and the contents were stirred as 120 g of Epoxy DEN 431 was added. The resulting solution was stirred at 100° C. for 10 minutes. Then 20 g of 1,1-dimethyl-3-phenyl urea were added and agitation was continued for an additional 5 minutes, after which the resin was discharged into pans and cooled.

The urea-accelerated resin was warmed to 80° C. and coated as a thin film on silicone treated release paper in a strip about 7 inches wide. A unidirectional tape was made by sandwiching a ribbon of carbon fiber between two layers of resin-coated release paper and then subjecting that sandwich to heat and pressure in a prepreg machine. The prepreg tape was 6 inches wide, had a fiber areal weight of 146 g/m² and contained 30.2 weight percent resin. The fiber used to make the tape was a polyacrylonitrile-based carbon fiber with a tensile strength of 730 ksi, a tensile modulus of 41.5 msi, a yield of 0.44 g/m, and a filament count of 12,000 per tow.

The tape was laid up into a sixteen ply unidirectional laminate (6"×12") and cured in an autoclave using the following cure schedule:
Heat from 75° F. to 266° F. at 3° F./min.
Hold at 266° F. for 1 hr.
Heat from 266° F. to 350° F. at 3° F./min.
Hold at 350° F. for 4 hr.
Cool from 350° F. to 77° F. at 3° F./min.

The laminate was postcured in a forced air oven at 220° C. for 4 hr. The postcured laminate was machined into test coupons to measure 0° flexural strength according to ASTM D-790. When tested at 350° F., the laminate had a flexural strength of 163 ksi, a flexural modulus of 21.7 msi and a fiber volume fraction of 58.8 percent, Another coupon was immersed in water at 160° F. for two weeks prior to testing. When tested at 350° F., this sample had a flexural strength of 137 ksi and modulus of 19.8 msi, indicating good property retention at elevated temperature under wet conditions.

EXAMPLE 24

Prepreg tape made in Example 23 was laid up into a 6"×12" 10-ply laminate with a configuration of $((\pm 30)_2 90)_S$. The laminate was cured and postcured as in Example 23 and then cut into 1"×10" strips for edge delamination strength testing. Edge delamination strength is a measure of composite toughness. The details of the test are described in the reference: SAMPE Journal Vol. 18, No. 4, July/August 1982, p 8 by T. K. O'Brien.

The edge delamination strength of the laminate was determined to be 32.2 ksi.

EXAMPLE 25

Prepreg tape made in Example 23 was laid up into an 8-ply 6"×12" laminate with a $(\pm 45)_{2S}$ configuration. The laminate was cured and post cured as in Example 23 and then cut into 1" by 10" strips to measure high temperature property retention in the wet condition.

The specimens were immersed in water at 160° F. for 2 weeks and then placed in an Instron testing machine to determine stiffness. The stiffness in tension of the moisture-conditioned specimen was determined at room temperature and at 350° F. after heating the specimen to that temperature in less than one minute. In this test the moisture conditioned composite retained 62 percent of its room temperature stiffness at 350° F., indicating excellent retention of stiffness at elevated temperature under wet conditions.

EXAMPLE 26

A 1 gallon working capacity Baker Perkins sigma blade mixer was charged with 4.0 Kg of Cyanate Ester A. The resin was heated to 140° C. and then 1.0 Kg of powdered polysulfone was added. The cyanate ester polysulfone mixture was blended and heated at 140° C. until all the polysulfone dissolved (2.5 hr), then cooled and discharged from the mixer.

A 2.0 Kg portion of the cyanate ester/polysulfone solution was blended with an additional 2.0 Kg of Cyanate Ester A at 80° C. for 1 hour. A dispersion of 160 g of 1-(4-chlorophenyl)-3-(3,4-dichlorophenyl) urea in 400 g Epoxy DEN 431 was added and mixing was continued for an additional 30 min. before discharging and cooling the resin formulation.

A sample of the resin was placed in a Brookfield Thermosel viscometer and the viscosity of the mixture was measured as the temperature of the Thermosel was raised at 1.1° C./min. The viscosity of the resin was approximately 100,000 cps at 70° C. The minimum viscosity was 2,500 cps at 135° C., after which the viscosity started to increase due to the effect of the urea accelerator on the cure.

A thin film of the resin was cast onto a siliconecoated release paper. A unidirectional prepreg tape was made by transferring the resin from the coated paper to a ribbon of carbon fiber under the action of heat and pressure in a prepreg machine. The final prepreg had a fiber areal weight of 141 g/m², a resin content of 38.4 precent by weight, and a width of 12 inches. The fiber used to make the tape was a polyacrylonitrile-based carbon fiber with a tensile strength of 350 ksi, tensile modulus of 57 msi, yield of 0.36 g/m, and filament count of 6,000 per tow. The unidirectional tape made with this resin retained tack and drape for more than 15 days.

The invention will thus be seen to be the use of organo urea compounds as latent cure accelerators for cyanate esters and urea compounds. The invention may be further seen to be directed to thermosetting compositions comprising 100 pbw of a cyanate ester, from about 0.5 to about 12 pbw of a urea compound latent cure accelerator, from about 4 pbw to about 25 pbw of an epoxy resin, and up to about 12 pbw of a thermoplastic such as a polysulforn. The urea compounds useful as latent cure accelerators in the practice of this invention have a plurality of organo radicals as N-substituents. These substituents may be aliphatic or aromatic hydrocarbyl radicals, such as, for example, alkyl, alkylene, aralkyl, aryl and the like. The hydrocarbyl radicals may also include further substituent groups such as halogen or the like that are not reactive with the remaining components. The cyanate ester formulations, which may further include such materials as coreactants, stabilizers, fibers, pigments and the like as is commonly practiced in the art, may be useful as adhesives, coatings, impregnating and laminating resins and encapsulating resins. Whole the invention has been illustrated by means of various example which are intended to be non-limiting, it will be apparent to those skilled in the art that further modifications and variations are possible without departing from the spirit and scope of the invention, which is defined by the appended claims.

We claim:

1. A thermosetting composition comprising a cyanate ester; a urea compound selected from the group consisting of alkyl aryl ureas, aryl ureas and mixtures thereof; and an epoxy resin.

2. The thermosetting composition of claim 1 comprising 100 pbw of said cyanate ester, from about 0.5 to about 12 pbw of said urea compound and from about 4 pbw to about 25 pbw of an epoxy resin.

3. The thermosetting composition of claim 1 further comprising up to about 12 pbw of a thermoplastic.

4. The thermosetting composition of claim 1 wherein the urea compound is an alkyl aryl urea selected from the group consisting of 1,1-dimethyl-3-phenyl urea, 1,1-dimethyl-3-(4-chlorophenyl) urea, 1,1-dimethyl-3-(3,4-dichlorophenyl) urea, 2,4-bis-(N,N-dimethylureido) toluene and mixtures thereof.

5. The thermosetting composition of claim 1 wherein the urea compound is a diaryl urea selected from the group consisting of 1,3-diphenyl urea, 1-(4-chlorophenyl)-3-(3,4-dichlorophenyl) urea and mixtures thereof.

6. A thermosetting composition comprising 100 pbw of a cyanate ester; from about 0.5 to about 12 pbw of a urea compound selected from the group consisting of alkyl aryl ureas, aryl ureas and mixtures thereof; from about 4 pbw to about 25 pbw of an epoxy resin, and up to about 12 pbw of a thermoplastic polysulfone.

7. The thermosetting composition of claim 6 wherein said urea compound is selected from the group consisting of 1,1-dimethyl-3-phenyl urea, 1,1-dimethyl-3-(4-chlorophenyl) urea, 1,1-dimethyl-3-(3,4-dichlorophenyl) urea, 2,4-bis-(N,N-dimethylureido) toluene, 1,3-dipheny urea, 1-(4-chlorophenyl)-3-(3,4-dichlorophenyl) urea and mixtures thereof.

* * * * *